United States Patent
Nebout

[11] 3,730,059
[45] May 1, 1973

[54] PISTON ACTUATED CONTROL APPARATUS FOR A TYPE BUILDING OR SHAPING MACHINE

[75] Inventor: Noel Nebout, Montlucon, France

[73] Assignee: Dunlop Holdings Limited, London, England

[22] Filed: Mar. 15, 1971

[21] Appl. No.: 124,268

[30] Foreign Application Priority Data

Mar. 9, 1970 France..............................7008348

[52] U.S. Cl. .....................92/140, 74/110, 254/50.3
[51] Int. Cl........F01b 9/00, F16h 21/44, B60c 25/14
[58] Field of Search.......................92/140, 136, 148, 92/37, 72, 76; 74/469, 110; 254/50.3

[56] References Cited

UNITED STATES PATENTS

| | | | |
|---|---|---|---|
| 2,532,254 | 10/1950 | Bouchard | 92/71 X |
| 3,200,800 | 8/1965 | Du Bois | 92/140 X |
| 997,190 | 7/1911 | Harvey | 92/140 |
| 2,800,270 | 7/1957 | Peterson | 92/76 |
| 2,907,550 | 10/1959 | Heinish | 92/140 X |
| 2,928,119 | 3/1960 | Fassero et al. | 254/50.3 X |
| 3,361,035 | 1/1968 | Roundtree | 92/140 X |

Primary Examiner—Martin P. Schwadron
Attorney—Ward, McElhannon, Brooks & Fitzpatrick

[57] ABSTRACT

A pneumatically or hydraulically operated control apparatus comprising a slide, at least two piston and cylinder assemblies and a lever means. This slide transmits movements from the apparatus, imparted to it by the piston and cylinder assemblies acting on the lever means. This apparatus may be used in conjunction with a machine that has components which require controlled movement. Such a machine is a tire building or shaping machine wherein two shafts require controlled movement in opposite directions. The movements of the slide can be imparted to the shafts by various lever systems, of which the following is a specification.

11 Claims, 6 Drawing Figures

PISTON ACTUATED CONTROL APPARATUS FOR A TYPE BUILDING OR SHAPING MACHINE

The present invention relates to a pneumatically or hydraulically operated control apparatus which makes it possible to impart displacements to one or more controlled components, the size and succession of which can be controlled accurately.

Machine for building pneumatic tire covers, in particular covers having a radial carcass — i.e., those in which the reinforcing filaments or cords are situated essentially in radial or meridian planes — generally contain a drum which comprises, or with which are associated, components symmetrically disposed with respect to the median plane of this drum and which must be displaced symmetrically during operation of the machine. These components are often controlled by means of a rod arrangement comprising two coaxial shafts, arranged in the axis of the drum and which are made to slide by an appropriate mechanism, with screws or piston and cylinder assemblies, in the opposite direction by the same amounts.

Known mechanisms of this type have numerous disadvantages among which may be cited slowness of movements, the complication of control of the symmetry of the displacements, and the difficulty in producing a simple and robust machine when successive displacements of varying amplitudes have to be carried out on the different components.

The present invention has the main object of remedying these disadvantages and creating a control device with piston and cylinder assemblies which makes it possible to impart accurate and rapid movements at a high rate to the components controlled.

According to the invention, a pneumatically or hydraulically operated control apparatus comprises a slide for transmitting controlled movements from the apparatus, at least two piston and cylinder assemblies arranged to act in parallel directions and lever means arranged to connect the slide and the piston and cylinder assemblies whereby the piston and cylinder assemblies operate together on said lever means to control the movement of the said slide.

Preferably the piston and cylinder assemblies are disposed in two groups, one on each side of the said slide.

In this case the lever means may comprise a bar, which is pivotally attached, at its center, to the slide, and, at its ends, to the piston and cylinder assemblies.

Also preferable is that the said piston and cylinder assemblies comprise double acting, integral back to back piston and cylinder assemblies.

Spacers can be used to adjust the length of piston stroke of the said piston and cylinder assemblies.

Also according to the invention, a machine comprises a control apparatus according to the above paragraphs two shafts to be displaced in opposite directions, a carriage being connected to each of said shafts, to transmit movements to the shafts, and means for transmitting the movement from said slide to said carriages, and means for reversing the movement transmitted to one shaft relative to the movement transmitted to the other shaft.

Apparatus in accordance with the invention will now be described, by way of example only, with references to the accompanying drawings, of which:

Figure 1:
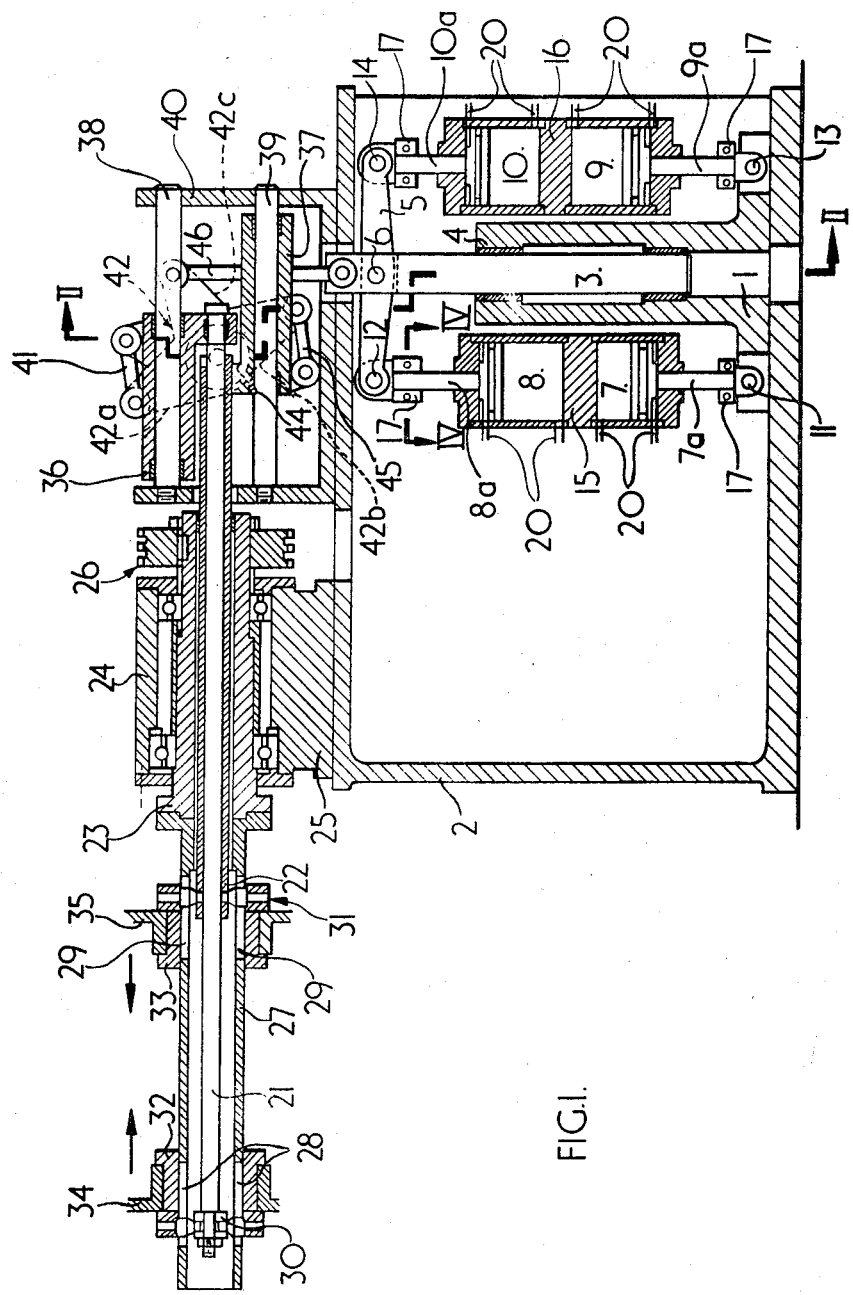
FIG. 1 is a diagrammatical sectional view through I—I of FIG. 2, of a pneumatic tire building machine including the control apparatus of the invention.

As shown in FIGS. 1 to 4, the apparatus comprises a support 1, fixed to the base 2 of the machine and in which is mounted a vertical slide 3 which can displace vertically by translation in guides 4.

A bar 5 is jointed to the slide 3 to swing about its center around a pivotal mounting 6 carried by the slide 3.

Two double piston and cylinder assemblies 7, 8 and 9, 10 having respectively piston rods 7a, 8a and 9a, 10a are attached by pivotal mountings 11, 12, 13 and 14, respectively to the support 1 and to the extremities of the bar 5.

The piston and cylinder assemblies 7, 8, 9 and 10 are arranged in pairs, back to back in a double-acting arrangement, and their cylinders are integral. The assemblies 7 and 8 are separated by a partition 15 and assemblies 9 and 10 by a partition 16.

The maximum piston strokes of the piston and cylinder assemblies can be equal, or as shown in the drawing, unequal, depending on the intended methods of application.

Figure 4:
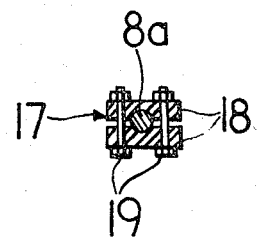
FIG. 4 is a section taken along IV—IV of FIG. 1.

The length of storke of each piston and cylinder assembly can be adjusted by fitting on its piston rod one or more spacers 17. As shown in FIG. 4, each spacer 17 can be formed from half collars 18 tightened on the piston rod by means of pins 19.

Each assembly is equipped with tubes 20 serving for introduction and escape of drive fluid, (e.g. air or oil). These tubes are connected to suitable distributors, (not shown) which make it possible to actuate the assemblies.

If $a$, $b$, $c$ and $d$ denote the maximum piston stroke of assemblies 7, 8, 9 and 10 respectively, and if pivotal mountings 12 and 14 are equidistant from the pivot 6 of the swing bar 5, it is seen that by actuating only one of the assemblies, the slide 3 can be given a displacement in either direction equal to half of the piston stroke of the assembly under consideration, (i.e., $a/2$, $b/2$, $c/2$ or $d/2$).

By associating the actions of several assemblies, it is possible to add or subtract these fundamental displacements.

If, in addition, the possibility of adjusting the piston strokes of the assemblies is considered, which is provided by use of the spacers 17, it can be seen that the displacement of the slide 3 can be controlled accurately between two extreme positions, separated from each other by a length equal to half of the sum of the maximum piston strokes of the four assemblies 7 to 10 [(i.e., $a+b+C+d)/2$]

Figures 2, 6:
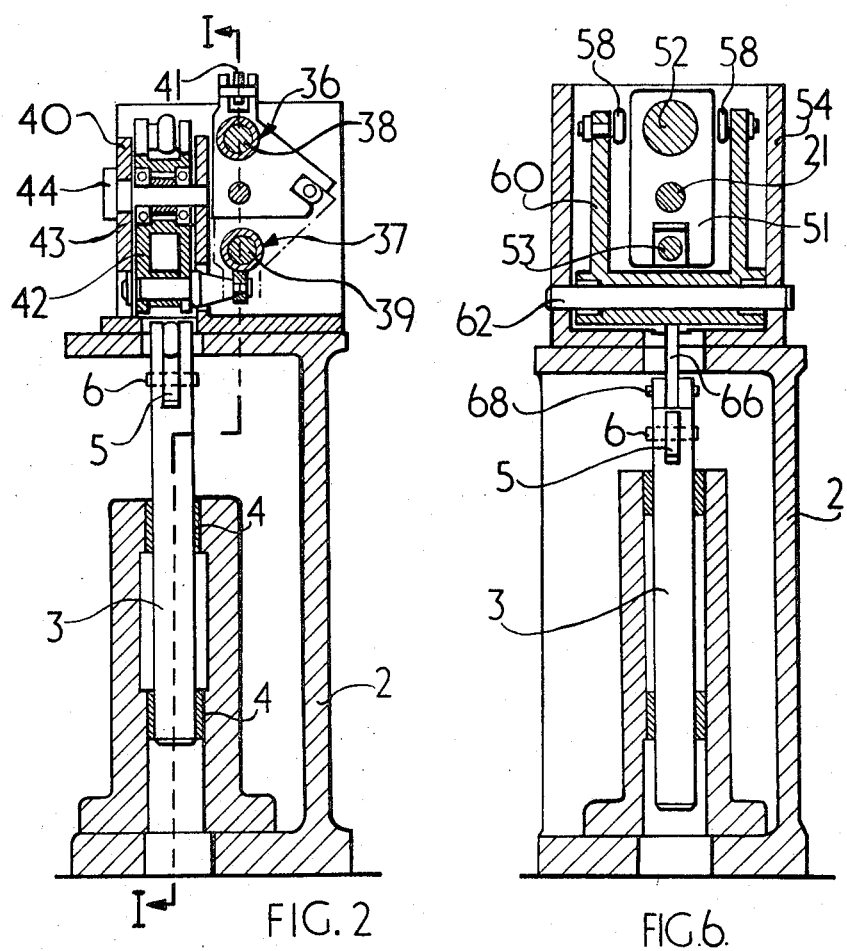
FIG. 2 is a section along II—II of FIG. 1.
FIG. 6 is a section along VI—VI of FIG. 5.
Figure 3:
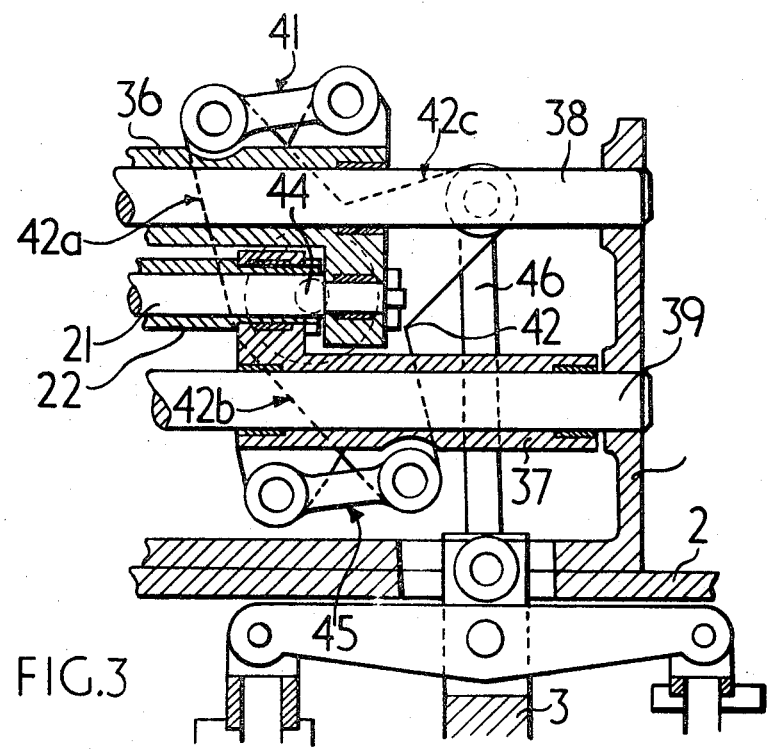
FIG. 3 is a view in detail on a larger scale of the mechanism which transmits the control movement to the coaxial shafts of the tire building machine.

In the application of the apparatus of the invention illustrated in FIGS. 1 to 3, the movements of the slide 3 are used to displace symmetrically in opposite directions two control shafts 21 and 22 of a pneumatic tire cover building machine.

As shown in particular in FIG. 1, the shaft 22 is tubular and can slide on the shaft 21 which is longer than the shaft 22.

These two shafts traverse longitudinally the tubular shaft 23 of the machine which is mounted in a double bearing 24 fixed to a block 25 carried by the framework 2. The shaft 23 can be driven by means of a pulley 26. The shaft 23 is extended by the shaft 27 of the building drum of the machine.

The shafts 21 and 22 end in this shaft 27 opposite longitudinal openings 28 and 29 where they are joined by connection pieces 30 and 31, extending through the openings 28 and 29, to sleeves 32 and 33 by means of which the components for displacement, e.g., the supports 34 and 35 of the tire building drum, can slide on the shaft 27.

At their other extremity, the shafts 21 and 22 are rotatably mounted in carriages 36 and 37 respectively, with which they translate integrally and to which are communicated the movements of the slide 3.

The carriages 36 and 37 are slidably mounted on bars 38 and 39, the ends of which are fixed to a support 40 integral with the framework 2, the bars 38 and 39 being parallel to the shaft 23.

The carriage 36 is pivotally connected through a connecting-rod 41 to one of the arms 42a of a lever member 42 which can pivot, by means of a bearing 43 (FIG. 2) on an axle 44 mounted on the support 40 perpendicularly to the shaft 23 of the machine.

The lever member 42 possesses a second arm 42b, symmetrical to the first in relation to a plane passing through the axis 44 and to which the carriage 37 is pivotally connected through a connecting rod 45 symmetrical with the connecting rod 41, in relation to the said axis so that any movement of the lever member is shown up by equal and opposite displacements of the carriages 36 and 37. The lever member 42 is displaced by the slide 3 by means of a third arm 42c which is pivotally connected by a connecting rod 46 to the slide 3.

In operation activation of one or more of the piston and cylinder assemblies 7, 8, 9 and 10, moves the bar 5 and the slide 3 is displaced by an amount which may be calculated, as previously described. This displacement of slide 3 is transmitted through the connecting rod 46 to the arm 42c of the lever member 42. The movement is then transmitted through the arms 42a and 42b of the lever member 42 to the connecting rods 41 and 45 and hence to the carriages 36 and 37 respectively, the carriage 36 being moved in the opposite direction to the carriage 37.

The movement of the carriages 36 and 37 cause the coaxial shafts 21 and 22 respectively to move in opposite directions thus causing the assemblies 32, 34 and 33, 35 of the tire building apparatus to also move in opposite directions to each other.

Figure 5:
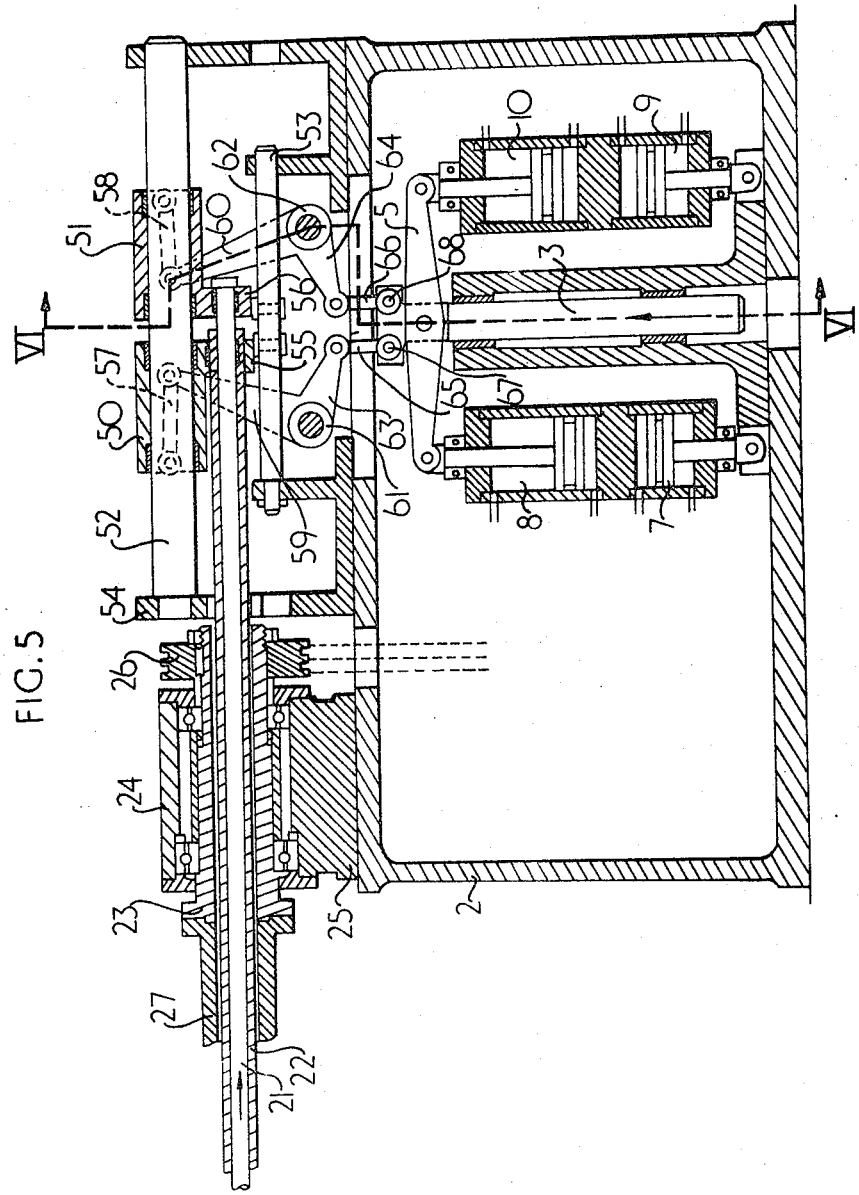
FIG. 5 is a diagrammatical sectional view similar to FIG. 1 of a variation of the apparatus shown in FIG. 1.

In the variation of the apparatus shown in FIGS. 5 and 6, in which the components which have not changed are given the same references, the shafts 21 and 22 are mounted, at their extremity opposite to the one housed in the shaft 27, in carriages 50 and 51 which slide on guide bars 52 and 53, the bars 52 and 53 being carried by a support 54 fixed to the framework 2 of the machine. The bars 52 and 53 are parallel to the shaft 23.

The carriages 50 and 51 are arranged symmetrically (with the exception of the bearings 55 and 56 which serve to mount shafts 21 and 22) on bars 52 and 53, relatively to a plane perpendicular to the said bars and passing through the longitudinal axis of the slide 3.

The carriages 50 and 51 are connected also symmetrically relative to this plane, by means of connecting rods 57 and 58, each to one arm belonging to one of the cranked levers 59 and 60 respectively. The levers 59 and 60 are mounted on axles 61 and 62, on the support 54, which axles are perpendicular both to the guide bars and the longitudinal axis of the slide.

Each of the cranked levers 59 and 60 comprises another arm, 63 and 64 respectively, by which it is connected, still with the same symmetry, by means of a connecting rod 65 or 66 to one of the twin axles 67, 68 carried by the slide 3.

In operation activation of one or more piston and cylinder assemblies 7, 8, 9 and 10 moves the bar 5 and hence the slide 3 is displaced. The movement of the slide 3 is transmitted through the connecting rods 65 and 66 to the arms 63 and 64 respectively of the cranked levers 59 and 60. This movement causes the cranked levers 59 and 60 to pivot on their respective axles 61 and 62 thus transmitting the movement through their other arms and connecting rods 57 and 58 to cause the carriages 50 and 51 respectively to move in opposite directions. The movement of the carriages 50 and 51 causes movement of the coaxial shafts 21 and 22 as previously described.

The amount of movement imparted to the carriages 50 and 51 by the cranked levers 59 and 60 is dependent on the ratio of the lengths of the arms of the cranked levers 59 and 60.

The invention can be used on any occasion where it it necessary to overcome the problem of transmitting precise displacements to one or more controlled components. As has been described above, one such application is in machines for building pneumatic tire covers, particularly radial carcass covers.

Having now described my invention, what I claim is:

1. A pneumatically or hydraulically operated control apparatus for controlling displacements to one or more controlled components comprising support means and a slide for transmitting controlled movements from the apparatus, said slide being of elongated form and moveable in said support means along its longitudinal axis, at least two piston and cylinder assemblies arranged to act in a direction parallel to said longitudinal axis and lever means pivotally connected to the slide and the piston and cylinder assemblies respectively, whereby on actuation of one or more of said at least piston and cylinder assemblies said lever means is displaced, causing displacement of said slide along its longitudinal axis, said slide transmitting the displacements to the one or more of said controlled components.

2. Apparatus according to claim 1 wherein said at least two piston and cylinder assemblies comprise double acting, integral back-to-back piston and cylinder assemblies arranged at least one on each side of said slide.

3. Apparatus according to claim 2 wherein said lever means comprises a bar pivotally attached, at its center, to said slide and, at is ends, to said piston and cylinder assemblies.

4. A pneumatically or hydraulically operated control apparatus and two shafts to be displaced in opposite directions, said apparatus comprising a slide for transmitting controlled movements from the apparatus, at least two piston and cylinder assemblies arranged to act in parallel directions and lever means arranged to connect the slide and the piston and cylinder assemblies whereby the piston and cylinder assemblies operate together on said lever means to control movement of the said slide; carriages connected to each of said shafts to transmit movements to the shafts, means for transmitting movements from said slide to said carriages, and means for reversing the movements trnsmitted to one shaft relative to the movements transmitted to the other shaft.

5. The arrangement according to claim 4 wherein said two shafts are mounted to control the building or shaping of a pneumatic tire.

6. The arrangement according to claim 4 wherein the said means for transmitting movement from said slide and for reversing the movement transmitted to one shaft relative to the other comprises a rod arrangement, said arrangement comprising a three armed lever, one arm of which is connected to the slide, and the other two arms are connected each to its respective carriage.

7. The arrangement according to claim 6 wherein said two arms of the lever which are connected to the carriages are symmetrically disposed about a plane passing through the pivotal axis of the lever whereby equal and opposite movements are transmitted to the carriages.

8. The arrangement according to claim 4 wherein the said carriages are disposed one on each side of a plane passing through the longitudinal axis of the said slide.

9. The arrangement according to claim 8 wherein the said means for transmitting movement from said slide and for reversing the movement transmitted to one shaft relative to the other comprises a cranked lever arrangement, said arrangement comprising two cranked levers, the said levers being disposed one on each side of said plane, the arms of the said levers being connected, to their respective carriages and to the said slide.

10. The arrangement according to claim 9 in which the carriages and cranked levers are disposed symmetrically relative to said plane whereby equal and opposite movements are transmitted to the carriages.

11. The arrangement according to claim 4 wherein the said carriages are mounted on guide rails parallel to the axis of the said shafts.

* * * * *